Patented May 10, 1932

1,858,100

UNITED STATES PATENT OFFICE

THOMAS O. McADOO, OF SALEM, VIRGINIA, ASSIGNOR TO INTERNATIONAL SILICA CORPORATION, A CORPORATION OF VIRGINIA

PROCESS OF TREATING SILICA-BEARING MATERIALS

No Drawing.  Application filed July 23, 1928. Serial No. 294,937.

This invention relates to a process of treating all types of silica-bearing materials to remove the silica content therefrom.

The object of this invention is to provide a simple, practical and inexpensive process of removing the silica content from all types of silica-bearing materials, such as silica sands, shales, green sand, kaolin, marl, clays, and the like.

Distributed throughout the earth's crust are many deposits of silica-bearing compounds. Many of these compounds contain silica combined with other valuable ingredients, and up to the present time it has been practically impossible to remove the silica content from these compounds so as to recover the other valuable chemical constituents.

By the use of this process, any and all types of silica-bearing compounds may be readily treated to remove substantially the entire amount of combined silica, making the recovery of the other ingredients a simple procedure.

In its broad concept, this process contemplates the digesting of any finely divided silica-bearing material with a halogen acid, treatment of the digested material by heat and pressure, removal of the silica from the solution, and recovery of valuable chemical compounds from the solution.

The following is a practical example of this process, using as a base material siliceous shale containing chemically combined silica, alumina and iron.

2,000 lbs. of shale is ground in any type of suitable pulverizer to pass through a 200 mesh screen. The finely ground silica-bearing material is then placed in a mixing tub together with 1,000 lbs. of commercial muriatic acid (hydrochloric acid) and 1,000 lbs. of water. After thorough mixing, batches of 200 lbs. of the mixture are placed in a rubber bag and a number of the filled bags placed in a pressure cooker or autoclave and subjected to a steam pressure of approximately 44 lbs. per square inch for a period of about one hour.

The heat or steam pressure is regulated so as to be just below the vulcanization point of the rubber bags, and in actual use this has been found to be about 44 lbs. of steam pressure. While it has been found convenient to place the batches of material in acid-proof bags, it is not essential, but any acid-resisting containers in which it is possible to treat with heat and pressure out of contact with the steam may be used. It is essential that the material be subjected to the heat and pressure out of actual contact with the steam so that no dilution of the acid content occurs by reason of being mixed with the condensed steam.

After the cooking or digestive step is completed, the bags or other containers are dumped into a settling tank. After a short period in the settling tank, practically all of the silica, in the form of silica hydrate, settles out of the solution. This silica hydrate is in a physical form resembling sand, and after separation from the liquid constituents of the solution, may be used for any of the purposes for which silica hydrate is adaptable.

The solution, after being separated from the silica content, may be treated in a suitable acid-resisting vessel or drier to remove the various products dissolved therein; in this instance, alumina and iron. However, the solution, after being separated from the silica, may be used to treat further siliceous material, and it has been found that the solution may be used upward to four times so that the initial acid and water mixture is available for treating 8,000 pounds of shale.

It is preferable to run the solution containing the acid, the water and dissolved ingredients to a drier or evaporator and it is preferred to use any suitable apparatus in which the solution may be heated to drive off the hydrogen chlorine content so that it can be condensed in water to form further acid. After the chlorine gas has been driven off, the solution is further treated until the water contained therein is evaporated, leaving in the drier or evaporator the various chemical products which were dissolved in the solution.

The dried mass obtained from the evaporated solution is then slightly acidified with muriatic acid, using 1,000 lbs. of water and 5 lbs. of acid to form the acidifying bath. It is essential to keep the acid content of the bath of less concentration than would have an effect upon the traces of silica remaining in the mass. This acidifying bath dissolves the alumina and iron content of the mass and leaves the traces of silica undissolved. The alumina and iron can then be separated from the solution by neutralizing it with any suitable alkali which precipitates the iron. The alumina can then be recovered in any well-known manner, and these ingredients used in the industrial arts for which they are suited.

An alternate method which may be utilized in place of the acidifying bath is the substitution therefor of an alkali bath. In operating under this alternate method, sodium hydroxide is substituted in place of the acid with the water, which precipitates the iron and silica content, while the alumina goes into solution.

In practical use, the acid bath is used in the final step of the process if the iron content of the mass is high and worth saving, while the caustic bath is used if the iron content is low and of little value.

A further modification of the process resides in the use of hydrofluoric acid in place of the muriatic acid in the digestive step of the process. If the hydrofluoric acid is used, only 500 lbs. of acid is mixed with the 1,000 lbs. of water and 2,000 lbs. of shale. Commercial strength acid, that is, 35% muriatic and 48% hydrofluoric acid, has been found to give exceptional results, although, of course, other strength acids may be used with satisfactory results.

It is to be understood that the present invention is not limited to the specific example given above, but is equally adaptable for the treatment of all silica-bearing compounds.

Claims:

1. The process of removing silica from silica-bearing compounds which consists in digesting the silica-bearing compounds in an acid bath, subjecting the digested material to 44 lbs. of steam pressure and removing the silica.

2. The process of removing silica from silica-bearing compounds which consists in digesting the silica-bearing compounds in an acid bath, subjecting the digested material to 44 lbs. of steam pressure for approximately one hour, and removing the silica.

3. The process of removing silica from silica-bearing compounds which consists in digesting the silica-bearing material in a hydrochloric acid bath, subjecting the digested material while in an autoclave to steam pressure of approximately three atmosphere, but out of direct contact therewith, and removing the silica.

4. The process of removing silica from silica-bearing compounds which consists in pulverizing the silica-bearing compounds, mixing the said pulverulent material with a halogen acid, subjecting small batches of the said mixture to a heat of approximately 44 lbs. steam pressure to remove the silica therefrom, separating the liquid solution from the silica, and driving off the liquid and gaseous constituents from said solution.

5. The process of removing silica from silica-bearing compounds which consists in treating said silica-bearing compounds with a halogen acid while subjected to a steam pressure of approximately three atmospheres, the silica-bearing compounds and the acid being present in the process in the ratio of 2 to 1 by weight, respectively.

6. The process of removing silica from silica-bearing compounds consisting in treating a mixture of 2,000 pounds of silica-bearing compounds with 1,000 pounds of commercial hydrochloric acid to heat and pressure of approximately 44 lbs. steam pressure and removing the silica therefrom.

In testimony whereof I affix my signature.

THOMAS O. McADOO.